May 17, 1960 E. J. PRATT 2,936,780
COMBINATION SOLENOID VALVE AND PRESSURE SWITCH
Filed April 2, 1956 3 Sheets-Sheet 1
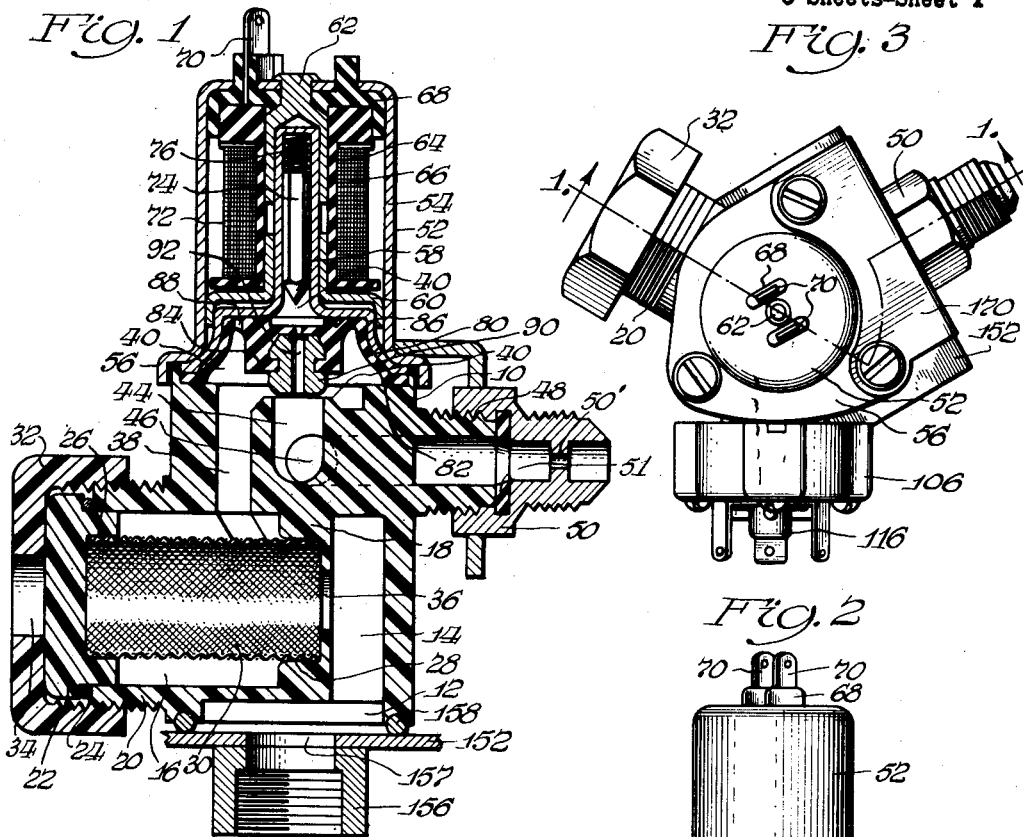
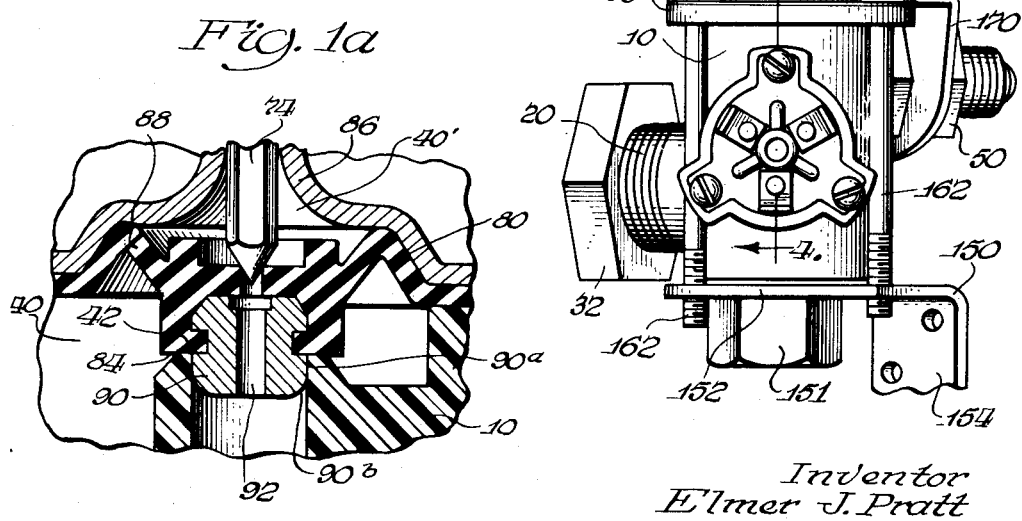
Inventor
Elmer J. Pratt
by Bair, Freeman & Molinare
Attorneys

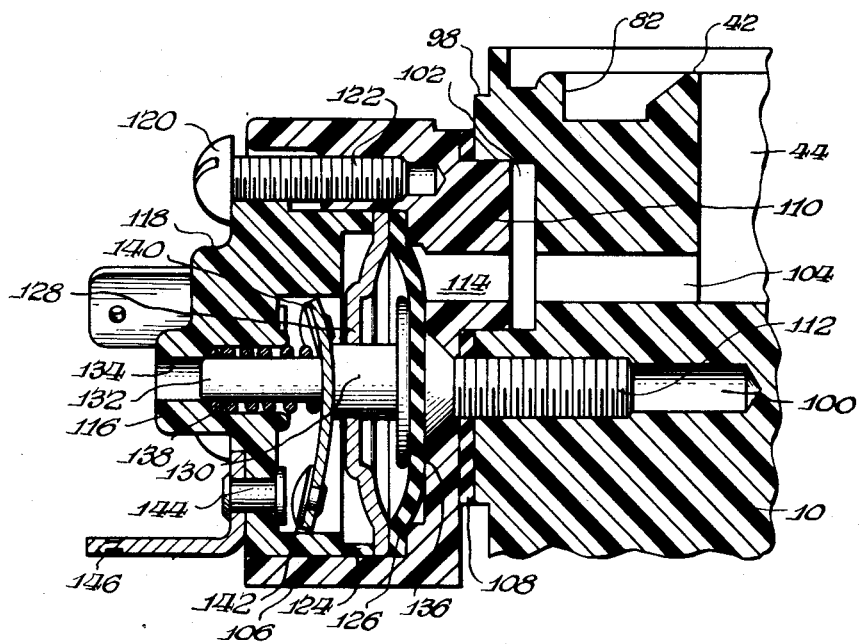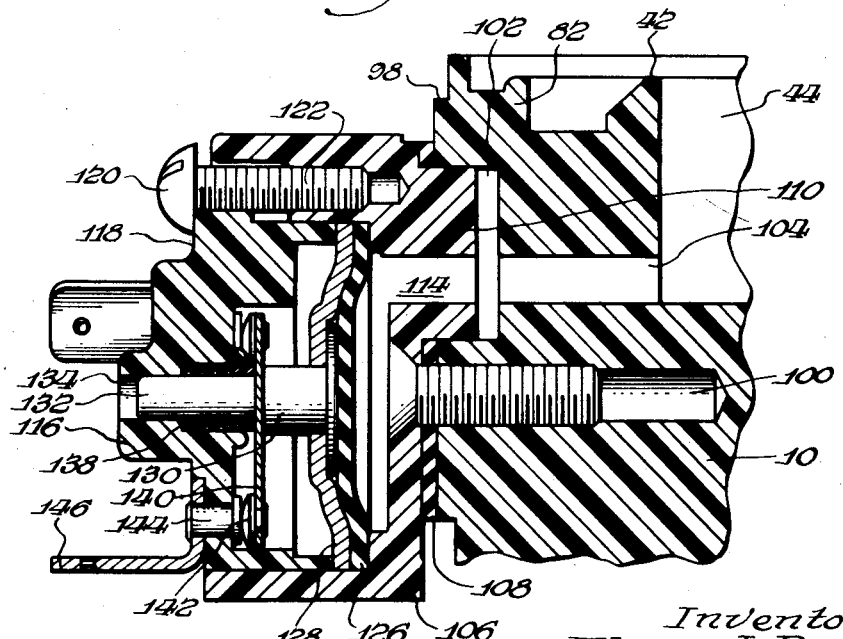

May 17, 1960     E. J. PRATT     2,936,780
COMBINATION SOLENOID VALVE AND PRESSURE SWITCH
Filed April 2, 1956     3 Sheets-Sheet 3

Inventor
Elmer J. Pratt
by Bair, Freeman & Molinare
Attorneys

United States Patent Office 2,936,780
Patented May 17, 1960

2,936,780

COMBINATION SOLENOID VALVE AND PRESSURE SWITCH

Elmer J. Pratt, Chicago, Ill., assignor to Guardian Electric Manufacturing Co., Chicago, Ill., a corporation of Illinois Application April 2, 1956, Serial No. 575,605

9 Claims. (Cl. 137—560)

The invention relates generally to a combined valve and control device, and more particularly to a combination solenoid controlled valve and pressure responsive electrical switch.

In controlling the fluid supply flow for automatic appliances having demand requirements which may vary with the characteristics of the appliance, the fluid being controlled, and the environmental conditions of practical use, it is necessary to provide a highly reliable and dependable valve unit of compact size and low cost capable of controlling such supply flow with efficiency and reliability. In order to satisfy the requirements for such a unit, it is necessary to provide a pilot operated valve which is self-closing, quick-acting, and packless; and which is capable of operating smoothly over its entire pressure range, without water hammer effect, chatter, knock or other fluid flow irregularities. Such a unit must be of compact size and low cost so as to accommodate full pipe size flow at a minimum manufacturing and operating cost. It is necessary that such a unit be of rugged construction and resistant to corrosion, wear, and deterioration.

In addition to the valve requirements for smooth operation, it is also highly desirable to effect regulation of other control operations in response to pressure conditions of fluid flow through the valve. In certain electrical appliances of the type requiring a regulated fluid supply, it is desirable to insure the maintenance of a minimum predetermined fluid pressure supply at all times during operation thereof. Typical installations having requirements of this kind, but not necessarily limited thereto, are automatic dishwashers and clothes-washers, liquid dispensing apparatus and drinking fountains, thermostatically controlled hot water and low pressure steam radiators, automatic lawn sprinklers, thermostatically controlled water supplies for cooling systems, electrically controlled shut-off for compressed air or gas applications, and the like.

The present invention is primarily directed towards a novel control device combining in a unitary body of compact size and form an electrically-actuated valve means and a fluid pressure responsive electrical switch in electrical circuit interrelation with the valve means It is a primary object of this invention, therefore, to provide a unitary combination solenoid controlled valve and pressure responsive electrical switch of compact size and low cost, which is highly efficient and reliable in operation, and which is operative to automatically maintain a minimum fluid pressure discharge for supplying an electrical appliance.

It is another object to provide a combination valve and switch unit mounted within a single unitary flow body, for use with an electrical domestic appliance requiring a fluid supply, wherein substantially instantaneous operation of the switch unit is effected in response to the pressure conditions within the body as determined by the operation of the valve.

It is a further object to provide a combination solenoid controlled diaphragm valve and pressure responsive switch mounted within a single unitary flow body adapted to receive a supply of fluid under pressure at its inlet and to discharge the fluid to a demand pressure at its outlet, wherein the switch is disposed immediately downstream of the valve, and wherein a restricted orifice is provided downstream of the switch, thereby insuring substantially instantaneous and reliable pressure responsive operation of the switch in response to a predetermined minimum fluid pressure.

It is still another object of this invention to provide a pilot actuated valve for the handling of fluids, wherein an expansible diaphragm or bellows actuated by pressure differentials provides a sealing disc having a closure plug centrally thereof for effecting modulation of the fluid kinetic energy during valve operation, thereby substantially reducing shock and vibration effects.

It is another object of this invention to provide a valve construction embodying a plastic body wherein a rigid valve mounting assembly serves to provide a coupling of the valve body inlet and outlet to a main flow line through rigid plumbing connections, and which serves to absorb forces and stresses which would otherwise be transmitted directly to the valve body.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a cross-sectional view in side elevation, partly broken away, of a combined valve and control device constructed in accordance with the present invention, taken substantially as indicated along the line 1—1 on Figure 3;

Figure 1A is a fragmentary view of a portion of Figure 1, showing the regulator valve in another operating position;

Figure 2 is a side elevational view of the device shown in Figure 1;

Figure 3 is a top plan view of the device shown in Figures 1 and 2;

Figure 4 is a fragmentary cross-sectional view taken substantially as indicated along the line 4—4 on Figure 2, showing the pressure responsive switch in its electric contact open position;

Figure 5 is a view similar to Figure 4 showing the pressure responsive switch in electric contact closed position;

Figure 6:
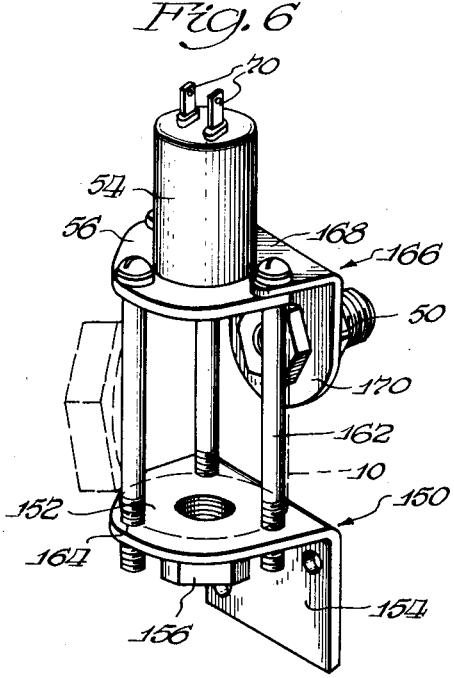
Figure 7:
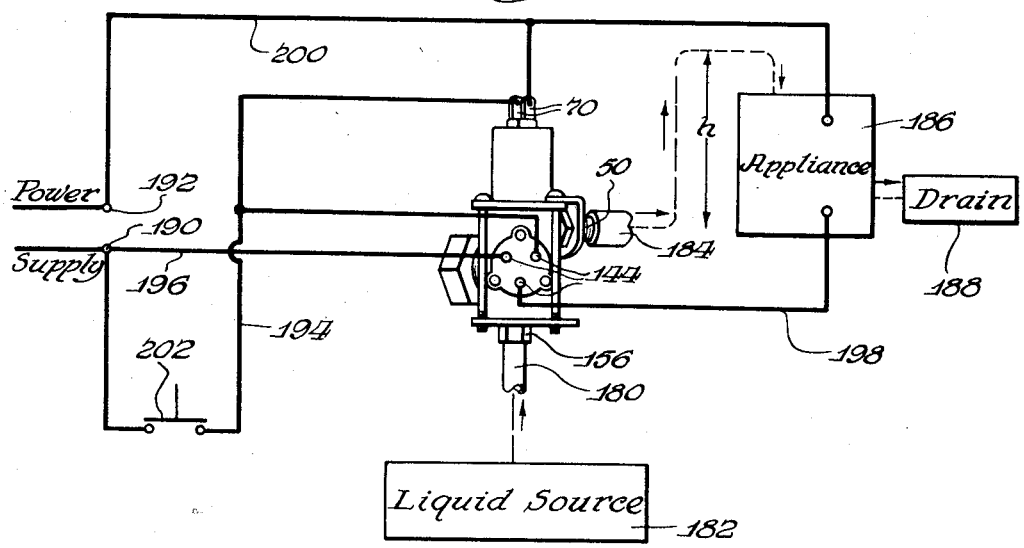

Figure 6 is a perspective view of the valve mounting assembly, with the valve body and other supported parts shown in dotted lines; and Figure 7 is a control circuit diagram showing the electrical inter-relation between the switch and solenoid of the control device of this invention, and the further electrical inter-relation of the control device with an electrical appliance of the type requiring a regulated fluid supply.

Referring now more particularly to Figures 1 to 3 of the drawing, I have indicated generally at 10 a unitary hollow valve body of generally cylindrical form. The body is formed of a suitable low cost plastic material, and is molded as a single integral unit. One end of the body 10 defines an outwardly open inlet chamber 12 which communicates inwardly with an inlet flow passage 14. The passage 14 is separated from a generally cylindrical screen chamber 16 by means of a partition wall 18. The longitudinal axis of the cylindrical screen chamber 16 is substantially at right angles to the longitudinal axis of the valve body 10. A laterally extending boss 20 serves to provide a substantially elongated form for the screen chamber 16.

A screen retainer 22 provides a flanged rim which is telescopically received within the outwardly open end of the lateral boss 20. An O-ring seal 24 is interposed between the screen retainer 22 and the outer end of the boss 20. The screen retainer 22 and the partition wall 18 are recessed at 26 and 28, respectively, to receive and support a generally cylindrical screen filter 30, preferably of Monel wire mesh. A screen retainer cap 32 is internally screw-threaded for cooperation with external screw threads provided by the lateral boss 20, and effects a locking closure of the screen retainer 22 in liquid-tight engagement against the boss 20. Both the screen retainer 22 and the cap 32 are formed of suitable molded plastic material. A central aperture 34 is provided in the cap 32 to permit the screen retainer to be fixedly held in position as the cap 32 is being screwed on, and is of particular importance when the screen 30 is replaced or serviced in a unit which has been mounted with the boss 20 pointing downwardly.

A cross passage 36 extends through the partition wall 18 and provides flow communication from the inlet flow passage 14 to the screen chamber 16 internally of the screen 30 supported therein. A flow of passage 38 permits discharge flow from the screen chamber 16 to an outwardly open valve chamber 40 remote from the inlet chamber 12. In this way, incoming liquid will pass from the inlet chamber 12, inlet flow passage 14, and cross passage 36 into the interior of the screen 30 and through the cylindrical side wall thereof into the screen chamber 16. The filtered liquid will then pass through the flow passage 38 to the valve chamber 40. This arrangement of parts permits the cylindrical screen filter to be readily removed for cleaning or replacement independently of access to the inlet chamber 12. This is an important feature to permit the screen to be readily serviced.

In electrical domestic appliances of the type requiring a liquid supply, particles of sediment, scale, and other debris carried by the liquid frequently lodge in associated valve devices and impair the operation of the appliance. It is necessary, therefore, in order to effect smooth and reliable flow regulation by a valve mechanism for use with such appliances to provide an effective filtration means. It is highly desirable that such a filter be an integral component of the valve unit while at the same time being readily adapted for cleaning or replacement independently of the installation of the valve body in the main flow line. The present arrangement permits the screen to be easily removed without disconnecting any pipes or fittings which may be associated with the inlet or outlet ends of the valve body, and does not necessitate any dismantling of the main valve structure.

The valve body 10 provides an internal annular valve seat 42 substantially centrally within the valve chamber 40. An outlet chamber 44 is defined centrally of the annular valve seat 42, and communicates with an outlet flow passage 46 which is directed laterally outwardly and substantially at right angles to the longitudinal axis of the valve body 10. The outlet flow passage 46 terminates outwardly within a lateral boss 48, which is externally screw-threaded to receive a separate connector nipple or adaptor 50 of some suitable metal, such as brass or the like. The diameter of the adaptor 50 may be suitably selected for attachment to an outlet pipe of any convenient size. A gasket 51, of suitable rubber or the like, is interposed between the end of the boss 48 and an internal flange of the adaptor 50 to provide a liquid-tight seal.

A pilot actuated valve assembly is mounted on the valve body 10 above the valve chamber 40. The valve assembly comprises a solenoid assembly 52 which serves as a pilot control mechanism. The solenoid assembly 52 includes a metal shell 54 having a mounting flange and rim 56 adapted to surround and seatingly engage the open end of the body 10 surrounding the valve chamber 40. A coil retainer 58 is press fit along an annular flange 60 into water-tight engagement with the inner wall of the metal shell 54, and cooperates with a plug 62 spaced therefrom and extending through the end wall of the metal shell 54, to support a coil assembly which includes a spool 64 of suitable insulating material, such as molded plastic or the like, and a coil winding 66. A terminal seal and insulator 68 of molded rubber or the like extends upwardly through the end wall of the metal shell 54 in sealing engagement therewith to support a pair of electrical terminal studs 70 which are rigidly mounted at their internal ends to a portion of the spool 64 and in electrical conducting relation therethrough to the coil winding 66.

The coil retainer 58 and plug 62 receive a plunger tube 72 which serves to define a guide passage to receive a stainless steel solenoid plunger 74 having a conical point at its inwardly directed end. A plunger return spring 76, also of a non-corroding material such as stainless steel, is biased to exert a downward (as seen in Figure 1) force on the plunger 74.

An expansible diaphragm or bellows 80 is positioned below the plunger tube 72, and its peripheral edge is received within an annular groove 82 formed in the open end of the valve body 10. The peripheral edge of the outwardly open lower portion of the plunger tube 72 is positioned above the annular groove 82 and fixedly positioned in contacting engagement against the peripheral edge of the diaphragm 80 by the mounting flange and rim 56 of the solenoid shell 54. The diaphragm 80 is particularly formed to provide a centrally disposed annular valve disc portion 84, and outwardly thereof an upwardly raised annular channel portion 86. This configuration permits axial movement of the valve disc portion 84 toward and away from sealing engagement upon the annular valve seat 42 without displacement of the outer peripheral edge of the expansible diaphragm 80 from its position of sealing engagement within the annular body groove 82. A pressure supply orifice 88 permits bleed-flow communication between the valve chamber 40 and an upper pressure chamber 40' through the diaphragm 80 at a point within the annular channel portion 86.

The central portion of the diaphragm 80 is particularly formed radially inwardly of the valve disc portion 84 in a novel manner so as to fixedly retain a metal valve plug 90, preferably formed of brass or the like, in centrally aligned position above the valve seat 42. The plug 90 is formed with an annular groove which receives an internal annular lip provided by the inner edge of the disc portion 84, thereby supporting the plug 90 in fixed position. The plug 90 is centrally apertured, as is also the expansible diaphragm 80 thereabove, to provide a pressure drain orifice 92 therethrough. The lower exposed surface portions of the plug 90 include a straight cylindrical side wall 90a and a rounded bottom edge 90b, as shown in Figure 1A.

The dimensional relations of the plug 90, valve seat 42, and outlet chamber 44 constitute an important feature of this invention. The chamber 44 is of cylindrical form, and the plug 90 is in coaxial alignment therewith. It is of essential importance that the cylindrical side wall 90a of the plug 90 have a diameter only slightly less than that of the chamber 44, so that in no event will the clearance therebetween exceed the critical value of 0.004 inch. Unless this tolerance is maintained, the plug 90 will be ineffective in performing its essential function of preventing chattering and water hammer, as will hereinafter be more fully described.

It will be apparent that the exposed portion of the plug 90 passes into the upper end of the chamber 44 as the valve disc 84 moves into contacting engagement with the valve seat 42. The shape of the plug 90, and mose particularly its rounded edge 90b, serves to effect a gradual "squeezing-off" of fluid flow across the valve seat 42 during valve closing operation, and constitutes a highly important feature of the present invention.

Although prior art valve constructions have employed valve diaphragms which operate to open and close the fluid supply by means of pressure differentials, such devices have not provided any effective modulation of the flow rate across the valve seat at the critical moment when the flow area is at its minimum. By incorporating a valve plug of special form, the present construction achieves a wholly new functional operation. The gradual "squeeze-off" of the kinetic energy of pressure flow, accomplished by the cooperating geometry of the valve plug 90, the annular valve seat 42, and the cylindrical chamber 44, serves to decelerate the main fluid flow as the expansible diaphragm 80 moves downwardly toward a position of closed-flow engagement between the disc portion 84 and the valve seat 42. Similarly, flow across the valve seat 42 is accelerated during opening movement of the diaphragm 80 away from the valve seat 42.

In this way, flow modulation is achieved, and the disadvantages of water hammer effect, excessive vibrations, and other fluid flow irregularities are effectively eliminated under substantially all valve operating conditions. The use of conventional diaphragms or dividing membranes does not provide a sufficient transverse movement of the valve-closing portion of the diaphragm relative to the valve seat to accomplish the modulating function of the present invention. As a result, constructions of the prior art have frequently resorted to the use of dashpots, flow-control washers, and other complex and costly devices for preventing undesirable vibrations and other adverse fluid flow effects. The present invention provides a low cost and highly efficient shut-off valve through the use of an expansible diaphragm or bellows actuated by pressure differentials and having a pilot drain orifice and a constant pressure supply orifice, and providing a disc portion for effecting valve closure, wherein a tapered valve plug centrally of the disc portion precedes the disc during shut-off of the pressure supply and trails the disc during opening of the pressure supply, thereby effecting a gradual change or modulation of the fluid kinetic energy during valve operation.

Referring now more particularly to Figures 4 and 5 of the drawing, the valve body 10 provides a still further lateral boss 98 extending outwardly therefrom substantially at right angles to the longitudinal axis of the valve body 10. A bore 100 extends through the boss 98 and terminates inwardly of the valve body 10 in a closed end. A recess 102 extends inwardly through the boss 98 and into the body 10. A cross passage 104 provides flow communication from the outlet chamber 44 immediately downstream of the valve seat 42 to the recess 102. A switch body 106, preferably molded of suitable plastic material, is positioned in cooperating relation against the boss 98 with a gasket 108 of rubber or like material disposed therebetween to provide a fluid-tight seal. A boss portion 110 of the switch body 106 is received within the valve recess 102, and a thread-cutting screw 112 is received within the bore 100 to effect a rigid and fluid-tight assembly of parts. A fluid pressure transmitting passage 114 extends through the switch body 106, and provides a continuous flow-passage in cooperation with the cross passage 104 and the recess 102.

A terminal block assembly 116 is mounted within the switch body 106. The assembly 116 comprises a terminal block 118, preferably formed of molded plastic material, which is rigidly secured to the switch body 106 by means of a plurality of thread-cutting screws 120 extending therethrough, and received within a bore 122 of the switch body 106. The terminal block 118 provides a peripheral lock rim 124 which cooperates with the peripheral edge of a diaphragm 126 for seatnig engagement thereof between the block 118 and the body 106. The diaphragm 126 is formed of rubber or like flexible material. A metal washer or retainer 128 is positioned between the lock rim 124 and the diaphragm 126 in tight, fixed engagement therewith.

A lifter or actuator member 130, preferably formed of molded plastic material provides a stem portion 132 which is slidably reciprocable in a bore 134 extending through the terminal block 118. The lifter 130 extends centrally through the washer 128 and terminates in an enlarged head flange 136 which contactingly engages a substantial central portion of the diaphragm 126. The lifter 130 is slidably reciprocable through the washer 128 which remains fixedly positioned as a stop member adapted to cooperate with the diaphragm 126. As best seen in Figure 5, a central countersunk portion of the washer 128 serves to receive the lifter head flange 136 therein. A compression spring 138 serves to bias the lifter 130 inwardly toward the diaphragm 126.

The lifter 130 carries along its stem portion 132 a contact spring assembly 140 which provides a plurality of electrical contact nibs 142, typically three in number. A cooperating plurality of contact rivets 144 are mounted in the terminal block 118 for engagement by the nibs 142 of the contact spring assembly 140. A plurality of electrical terminal studs 146 are fixedly secured to the terminal block 118 by the rivets 144 in electrical conducting relation therewith.

Under no-flow or zero downstream pressure conditions, or fluid pressures below a predetermined minimum pressure at which a regulated fluid supply is to be provided by the unit, the compression spring 138 serves to bias the lifter 130 toward the right, as seen in Figure 4, and the contact spring assembly 140 is moved therewith to effect spacing between the nibs 142 and the rivets 144. In this way, any control circuit in electrical conducting relation with the terminal studs 146 is interrupted or in an open-switch condition.

By selecting an appropriate compression spring force, the closed-circuit switch position may be maintained throughout normal flow conditions, wherein the fluid pressure transmitted through the passages 104, 114 to the diaphragm 126 is sufficient to overcome the bias force of the spring 138 and shift the lifter 130 to the left, thereby effecting contacting engagement between the nibs 142 and the contact rivets 144, as seen in Figure 5. Under conditions of substantially decreased (below a predetermined minimum operating value) or zero downstream pressure, the spring 138 will transmit a returning force to the lifter 130 to cause sliding movement thereof to the right, thereby effecting contact separation and circuit opening, as seen in Figure 4. Under such closed or open circuit conditions, appropriate control operations may be effected correspondingly. The pressure responsive switch device which has been disclosed may be employed to actuate any given control operation as desired.

In the past, the pressure supply or inlet line connection to the inlet side of shut-off and control valves for automatic dishwashers have been conventionally made with rigid pipe fittings. It has been necessary, therefore, that the valve body itself be sufficiently strong to withstand the torques and strains of wrench action when the pipe connection is made or disconnected. The outlet connections have likewise presented similar problems requiring substantial valve body strength. Valves of low cost molded plastic materials have been highly desirable for many appliance applications, such as electrical dishwashers and the like, except for the risk of breakage or cracking of the valve body while making a rigid inlet pipe connection. The fragile nature of plastic valve bodies, as well as the difficulties in effecting screw-threaded coupling of low coefficient of friction plastics to metals, have limited their use in many appliances despite the desirable low cost and non-corroding features of an integrally molded plastic body. It is an important feature of the present invention to provide a molded plastic body in combination with a novel pipe connector and valve supporting assembly, as will be hereinafter described.

As best seen in Figures 1 to 3 of the drawing, I provide a valve mounting assembly which comprises a bracket 150 having a seating flange 152 and a mounting flange 154. A pipe fitting 156 is butt welded below the seating flange 152 in central alignment with a flow passage 157 therethrough. The seating flange is disposed in contacting engagement against the open end of the valve body 10 which defines the inlet chamber 12. An O-ring 158 is positioned in a suitable annular groove formed at the open end of the valve body so as to provide a fluid-tight pressure seal for the seating flange when fixedly held thereagainst.

As clearly seen in Figure 3 of the drawing, the mounting flange 56 of the solenoid assembly shell 54 is radially outwardly enlarged at three points and provided with apertures through which elongated threaded mounting bolts 162 extend. Corresponding apertures 164 are provided in the seating flange 152 of the bracket 150, and are suitably threaded for coupling cooperation with the bolts 162. The head ends of the bolts 162 overlie the mounting flange 56.

An adaptor locking bracket 166 provides a seating flange 168 having apertures through which two of the bolts 162 extend to effect tight seating engagement of the seating flange 168 upon the mounting flange 56. A nipple-receiving flange 170 extends downwardly from the seating flange 168 and is suitably apertured for sliding and non-rotatable reception of the connector nipple 50 at the valve body outlet.

In this way, a metal pipe connector fitting is provided in fluid-tight flow communication with the inlet to the valve body, but is not mechanically connected to the valve body in such a way that harmful forces or strains are transmitted thereto. The pipe fitting 156 is integrally secured to a rigid mounting assembly including the bracket 150, the solenoid housing mounting flange 56, the mounting bolts 162 and the adaptor locking bracket 166. The adaptor nipple 50 at the flow outlet is thereby rigidly secured to the pipe fitting 156 at the flow inlet with the molded plastic valve body 10 fixedly supported therebetween. A substantial amount of the pipe line strains and stresses which may occur at either the inlet or outlet ends of a practical installation will not be transferred to the valve body 10, but will instead be absorbed by the rigid metal mounting structure.

The valve body 10, the solenoid assembly 52, and the bracket 150 are maintained as a unitary assembly only by means of the compression forces exerted by the mounting bolts 162 in pulling the flanges 56 and 152 toward each other and into fluid-tight sealing engagement with the opposite ends of the valve body 10, as clearly seen in Figure 6 of the drawing.

The operation of the solenoid controlled valve disclosed by the present invention is best described in connection with a typical and illustrative electrical dishwater installation. Although water is the particular fluid hereinafter referred to, it will be understood that the operation of the present invention is not necessarily limited thereto. Referring now more particularly to Figure 7 of the drawing, the inlet fitting 156 is connected by conventional rigid plumbing means 180 to a hot water supply under pressure 182. The outlet fitting 50 is connected to a flow conduit, which may for example extend above the valve unit, and which discharges into a dishwasher 186. The path of inlet water flow from supply 182 into the valve body 10, outlet flow from the valve body and through the conduit 184 to the appliance 186 (the control valve conventionally being mounted within a unitary appliance housing in the case of dishwashers), and from the appliance to a drain 188, has been indicated in Figure 7 by dotted line and directional arrows.

It will be apparent that the pressure to which the water flow from the valve body is discharged at fitting 50 is equal to the pressure within the appliance chamber receiving the water plus whatever water head $h$ may be provided by the use of a vertical riser portion in the conduit 184. Since the head $h$ is normally quite small, and since the appliance chamber receiving the water is normally vented, the outlet flow from the valve takes place at substantially atmospheric pressure. Discharge will also occur at substantially atmospheric pressure in those installations which locate the control valve at the same level or somewhat above the discharge into the appliance. It will be understood, however, that the principles of operation of the present valve construction are the same even if the appliance should be operated at a positive pressure above atmospheric, provided merely that the inlet fluid supply is at a sufficient pressure.

In order to enable efficient and substantially instantaneous operation of the pressure responsive switch means in cooperation with the solenoid valve, it is an essential feature of this invention to provide a restricted orifice 50' downstream of the pressure switch. The orifice 50' is necessary to effect a sufficient pressure within the outlet flow passage 46 to operate the pressure switch. As shown in Figure 1, the restricted orifice 50' may be disposed within the fitting 50 as an integral portion thereof. It will be understood, of course, that the flow restriction may be placed at any convenient location downstream of the pressure responsive switch and prior to flow discharge into the appliance 186.

An electrical current is applied to the solenoid 66 and serves to create a magnetic field which attracts and lifts the solenoid plunger 74 away from the drain orifice 92. The opened orifice 92 permits pressure to escape from the pressure chamber 40' to the outlet flow passage 46. Relief of pressure within the chamber 40' allows the inlet line flow pressure within the valve chamber 40 to lift the valve disc 84 from the valve seat 42 and withdraw the flow modulating plug 90 from the outlet chamber 44. Withdrawal of the plug 90 effects valve opening in a progressively increasing manner, thereby smoothly accelerating the pressure flow across the valve seat and minimizing shock or vibration. When the diaphragm is elevated into contacting engagement with the transversely flared portion of the plunger tube 72 thereabove, the valve will be in its full-open position for maximum flow through the valve body 10. This full-open position is shown in Figure 1 of the drawing.

The electrical circuit of the appliance 186 is operatively connected by means of a power and control circuit to a suitable source of current, indicated on Figure 7 as Power Supply and having terminals 190 and 192. A lead line 194 connects the terminal 190 to one of the three terminals 144 and to one of the two studs 70 of the valve unit. A lead 196 connects the same terminal 190 to another of the terminals 144. The third terminal 144 is connected by a lead 198 to the appliance. The other power supply terminal 192 is connected by a lead 200 to the other stud 70 and to the appliance. A push-button switch 202 is provided in the line 194, although it will be understood that the switch can be equally well positioned in the line 200.

In order to operate the dishwasher 186, the push-button 202 is manually depressed to close the power supply and control circuit through the valve unit and the appliance. The three contacts 144 of the valve unit will be closed to complete the circuit only when a predetermined liquid pressure is transmitted through the pressure transmitting passage 114 to the switch diaphragm 126. If the necessary liquid pressure is not available within the valve body, the pressure responsive switch will not close so as to complete the electrical circuit when the push-button 202 is closed, the appliance 186 will therefore not be operated. Also the electrical circuit inter-connection between the pressure responsive switch contacts 144 and the studs 70, which provide electrical energization of the solenoid coil 66, is such that the solenoid will be energized when the push-button 202 is depressed but will not remain energized after the push-button has been released if the necessary predetermined minimum liquid pressure is not available to close the contacts 144. In this way, the pressure responsive switch acts to lock the solenoid in its energized or plunger-withdrawn and valve-open position if the necessary liquid pressure is present to operate the switch. At the same time, closing of the switch also serves to actuate the operating circuitry of the appliance 186 itself.

When the electrical current is shut off from the solenoid coil 66, the plunger 74 will be released and the return spring 76 will slide the plunger 74 downwardly to position its point within the drain orifice 92. Closure of the drain orifice 92 by the solenoid plunger 74 causes the inlet supply line pressure to develop within the pressure chamber 40' above the diaphragm 80 by transmission through the pressure supply orifice 88. By virtue of the differential pressure areas, the supply line pressure in the chamber 40' causes the diaphragm 80 to travel downwardly and effect valve closing engagement of the disc 84 upon the valve seat 42. The flow modulating plug 90 carried by the diaphragm centrally of the valve disc 84 effects a gradual "squeeze-off" or deceleration of the upstream supply line flow across the valve seat during the closing operation to reduce shock or chattering and eliminate water hammer. When the valve is fully closed, as shown in Figure 1A of the drawing, the supply line pressure in the chamber 40' will hold the valve disc 84 in tightly engaged relation against the valve seat 42. It will be apparent that safety of operation is assured in the event of an electric power failure because the pressure-line closing operation of the valve will serve to effect automatic shut-off.

Changes may be made in the construction and arrangement of the parts of my Combined Solenoid Valve and Pressure Switch without departing from the real spirit and purpose of my invention, and it is my intention to cover by the claims any modified forms of structure or use of mechanical improvements which may be reasonably included within their scope.

What I claim as new and desire to obtain by Letters Patent of the United States is:

1. A valve construction comprising in combination a valve body and a mounting assembly, said valve body being of hollow elongated form outwardly open at its opposite ends to define a flow inlet at its one end, said valve body having an outwardly open hollow boss extending laterally thereof adjacent its other end to define a flow outlet, a pipe fitting mounted on the end of said lateral boss, said mounting assembly comprising an inlet bracket having an apertured seating flange, a pipe fitting rigidly secured to said seating flange and aligned with said aperture, said seating flange being disposed as a closure over the inlet end of said valve body, a mounting flange disposed as a closure over the other end of said body, an adaptor bracket apertured to receive said valve body outlet fitting in non-rotatable relation therethrough and providing a seating flange portion overlying said mounting flange, connector means detachably securing said adaptor seating flange and mounting flange to each other and both to said inlet seating flange for supporting said valve body between said inlet and outlet pipe fittings.

2. A valve construction comprising in combination a valve body and a mounting assembly, said valve body being a unitary molded plastic body of hollow elongated form outwardly open at its opposite ends to define a flow inlet at its one end, said valve body having an integrally-formed outwardly open hollow boss extending laterally thereof adjacent its other end to define a flow outlet, a pipe fitting mounted on the end of said lateral boss, said mounting assembly comprising an inlet bracket having an apertured seating flange, a pipe fitting rigidly secured to said seating flange and aligned with said aperture, said seating flange being disposed as a closure over the inlet end of said valve body, a mounting flange disposed as a closure over the other end of said body, an adaptor bracket apertured to receive said valve body outlet fitting in non-rotatable relation therethrough and providing a seating flange portion overlying said mounting flange, connector means detachably securing said adaptor seating flange and mounting flange to each other and both to said inlet seating flange for supporting said valve body between said inlet and outlet pipe fittings.

3. In combination with an electrical appliance requiring a regulated fluid supply, a control device comprising a unitary body of generally hollow form, said body having a flow inlet adapted to receive fluid under pressure and a flow outlet connected to said appliance and adapted to deliver said fluid to said appliance, a valve seat defined within said body intermediate said inlet and outlet, electrically-actuated valve means cooperating with said valve seat and substantially instantaneously movable between full-open and full-close positions to control fluid flow through said body, means whereby said valve means is normally biased closed, pressure responsive switch means carried by said body in flow communication therewith intermediate said valve means and said flow outlet, said switch means being actuated to a closed position when fluid pressure of predetermined magnitude is developed downstream of said valve means, means whereby said switch means is biased to return to an open position when the fluid pressure falls below said predetermined magnitude, a restricted orifice operatively associated with said body downstream of said switch, and electrical circuit means interconnecting said valve means, pressure switch and appliance in a control circuit, wherein said pressure switch operates while closed to maintain said valve means energized in full-open position, and further operates to energize said appliance.

4. In combination with an electrical appliance requiring a regulated fluid supply, a control device comprising a unitary molded body of generally hollow cylindrical form, said body being outwardly open at its opposite ends and defining a flow inlet at one end, said body having a first integrally formed outwardly open hollow boss extending laterally thereof to define a flow outlet, said outlet having a fluid connection to said appliance, said body having a second integrally formed outwardly open hollow boss extending laterally thereof and receiving in fluid-tight relation therein a pressure responsive electrical switch unit in flow communication with said body, a valve seat defined within said body and communicating downstream with said flow outlet and upstream with the other end of said body, electrically-actuated valve means closing said other end of said body and cooperating with said valve seat and substantially instantaneously movable between full-open and full-close positions to control fluid flow through said body, means whereby said valve means is normally biased closed, means whereby said switch means is actuated to a closed position when a fluid pressure of predetermined magnitude is developed downstream of said valve means, a restricted orifice operatively associated with said valve body downstream of said switch, and electrical circuit means interconnecting said valve means, pressure switch, and appliance in a control circuit, wherein said pressure switch operates while closed to maintain said valve means energized in full-open position, and further operates to energize said appliance.

5. A combination valve and switch assembly comprising a unitary body of generally hollow form, said body having a flow inlet adapted to receive fluid under pressure and a flow outlet adapted to discharge said fluid, a valve seat defined within said body intermediate said inlet and outlet, fluid pressure operated main valve means cooperating with said valve seat and substantially instantaneously movable between full-open and full-close positions in response to pressure differential actuation to control fluid flow through said body, electrical actuating means including a pilot valve for said main valve means serving to control said pressure differential to cause full opening of said valve means automatically upon energization thereof and full closing automatically upon de-energization thereof, means whereby said pilot valve is normally biased closed, pressure responsive switch means carried by said body in flow communication therewith intermediate said main valve means and said flow outlet, means whereby said switch means is actuated to a closed position when a fluid pressure of predetermined magnitude is developed downstream of said valve means, means whereby said switch means is biased to return to an open position when the fluid pressure falls below said predetermined magnitude, and electrical circuit means interconnecting said actuating means and pressure switch in a control circuit, wherein said pressure switch operates while closed to maintain said pilot valve energized in full-open position.

6. In combination with an electrical appliance requiring a regulated fluid supply, a control device comprising a unitary body of generally hollow form, said body having a flow inlet adapted to receive fluid under pressure and a flow outlet connected to said appliance and adapted to deliver said fluid to said appliance, a valve seat defined within said body intermediate said inlet and outlet, electrically-actuated valve means cooperating with said valve seat and substantially instantaneously movable between full-open and full-close positions to control fluid flow through said body, means whereby said valve means is normally biased closed, pressure responsive switch means carried by said body in flow communication therewith intermediate said valve and said flow outlet, said switch means being actuated to a closed position when fluid pressure of predetermined magnitude is developed downstream of said valve means, means whereby said switch means is biased to return to an open position when the fluid pressure falls below said predetermined magnitude, and electrical circuit means interconnecting said valve means, pressure switch and appliance in a control circuit, wherein said pressure switch operates while closed to maintain said valve means energized in full-open position, and further operates to energize said appliance.

7. A combination valve and switch assembly comprising a unitary body of generally hollow form, said body having a flow inlet adapted to receive fluid under pressure and a flow outlet adapted to discharge said fluid, a valve seat defined within said body intermediate said inlet and outlet, fluid pressure operated main valve means cooperating with said valve seat and substantially instantaneously movable between full-open and full-close positions in response to pressure differential actuation to control fluid flow through said body, solenoid-actuated plunger means and a cooperating pilot valve for said main valve means serving to control said pressure differential to cause full opening of said valve means automatically upon energization thereof and full closing automatically upon de-energization thereof, means whereby said pilot valve is normally biased closed, pressure responsive switch means carried by said body in flow communication therewith intermediate said main valve means and said flow outlet, means whereby said switch means is actuated to a closed position when a fluid pressure of predetermined magnitude is developed downstream of said valve means, means whereby said switch means is biased to return to an open position when the fluid pressure falls below said predetermined magnitude, and electrical circuit means interconnecting said actuating means and pressure switch in a control circuit, wherein said pressure switch operates while closed to maintain said pilot valve energized in full-open position.

8. A combination valve and switch assembly comprising a unitary body of generally hollow form, said body having a flow inlet adapted to receive fluid under pressure and a flow outlet adapted to discharge said fluid, a valve seat defined within said body intermediate said inlet and outlet, fluid pressure operated main valve means cooperating with said valve seat and substantially instantaneously movable between full-open and full-close positions in response to pressure differential actuation to control fluid flow through said body, electrical actuating means including a pilot valve for said main valve means serving to control said pressure differential to cause full opening of said valve means automatically upon energization thereof and full closing automatically upon de-energization thereof, means whereby said pilot valve is normally biased closed, pressure responsive switch means carried by said body in flow communication therewith intermediate said main valve means and said flow outlet, means whereby said switch means is actuated to a closed position when a fluid pressure of predetermined magnitude is developed downstream of said valve means, means whereby said switch means is biased to return to an open position when the fluid pressure falls below said predetermined magnitude, a restricted orifice operatively associated with said body downstream of said switch, and electrical circuit means interconnecting said actuating means and pressure switch in a control circuit, wherein said pressure switch operates while closed to maintain said pilot valve energized in full-open position.

9. A combination valve and switch assembly comprising a unitary body of generally hollow form, said body having a flow inlet adapted to receive fluid under pressure and a flow outlet adapted to discharge said fluid, a valve seat defined within said body intermediate said inlet and outlet, fluid pressure operated main valve means cooperating with said valve seat and substantially instantaneously movable between full-open and full-close positions in response to pressure differential actuation to control fluid flow through said body, electrical actuating means including a pilot valve for said main valve means serving to control said pressure differential to cause full opening of said valve means automatically upon energization thereof and full closing automatically upon de-energization thereof, means whereby said pilot valve is normally biased closed, pressure responsive switch means carried by said body in flow communication therewith intermediate said main valve means and said flow outlet, means whereby said switch means is actuated to a closed position when a fluid pressure of predetermined magnitude is developed downstream of said valve means, means whereby said switch means is biased to return to an open position when the fluid pressure falls below said predetermined magnitude, a restricted orifice in said flow outlet, and electrical circuit means interconnecting said actuating means and pressure switch in a control circuit, wherein said pressure switch operates while closed to maintain said pilot valve energized in full-open position.

References Cited in the file of this patent

UNITED STATES PATENTS

| | | |
|---|---|---|
| 891,568 | Runnion | June 23, 1908 |
| 895,426 | Cable | Aug. 11, 1908 |
| 926,389 | Collin | June 29, 1909 |
| 960,569 | Moon | June 7, 1910 |
| 1,081,693 | Parker | Dec. 16, 1913 |
| 1,114,398 | Sloan | Oct. 20, 1914 |
| 1,159,518 | Maul | Nov. 9, 1915 |
| 2,309,770 | Johnson | Feb. 2, 1943 |
| 2,476,927 | Stojanek | July 19, 1949 |
| 2,479,359 | Holt | Aug. 16, 1949 |
| 2,612,187 | Romanelli | Sept. 30, 1952 |
| 2,661,019 | Snyder | Dec. 1, 1953 |
| 2,712,324 | Lund | July 5, 1955 |

FOREIGN PATENTS

| | | |
|---|---|---|
| 441,794 | France | June 4, 1912 |